US012450212B2

United States Patent
Chang et al.

(10) Patent No.: US 12,450,212 B2
(45) Date of Patent: *Oct. 21, 2025

(54) FRAMEWORK FOR LIVE DATA MIGRATION

(71) Applicant: Palantir Technologies Inc., Denver, CO (US)

(72) Inventors: Allen Chang, Mountain View, CA (US); Christopher Male, Menlo Park, CA (US); David Cohen, Los Altos, CA (US); Dragos-Florian Ristache, Palo Alto, CA (US); Danielle Kramer, Brooklyn, NY (US); John Garrod, Franklin, TN (US); Michael Harris, Carmel, IN (US); Ryan Zheng, Sunnyvale, CA (US); Stephen Freiberg, Denver, CO (US)

(73) Assignee: Palantir Technologies Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/745,838

(22) Filed: Jun. 17, 2024

(65) Prior Publication Data

US 2024/0338348 A1 Oct. 10, 2024

Related U.S. Application Data

(63) Continuation of application No. 17/818,272, filed on Aug. 8, 2022, now Pat. No. 12,050,567.

(Continued)

(51) Int. Cl.
*G06F 16/21* (2019.01)
*G06F 16/25* (2019.01)

(52) U.S. Cl.
CPC .......... *G06F 16/214* (2019.01); *G06F 16/254* (2019.01); *G06F 16/258* (2019.01)

(58) Field of Classification Search
CPC .... G06F 16/214; G06F 16/254; G06F 16/258; G06F 11/1471; G06F 21/53;
(Continued)

(56) References Cited

U.S. PATENT DOCUMENTS 9,298,371 B1* 3/2016 Selvam ................. G06F 3/0632
9,521,218 B1* 12/2016 Fan ....................... H03M 7/607
(Continued)

FOREIGN PATENT DOCUMENTS

EP 2 194 467 6/2010
EP 4 134 805 2/2023

OTHER PUBLICATIONS

Official Communication for European Patent Application No. 22189684.8 dated Nov. 11, 2024, 11 pages.
(Continued)

*Primary Examiner* — Phong H Nguyen
(74) *Attorney, Agent, or Firm* — Knobbe, Martens, Olson & Bear, LLP

(57) ABSTRACT

Systems and methods including a framework for migration of live data. The method may comprised, by one or more hardware processors executing program instructions, receiving, at a migration proxy of the framework, code for reading data and writing data compatible with each of a plurality of states of a migration of data in a data store, wherein a service is at least intermittently reading data from and writing data to the data store; determining, by a migration runner of the framework, to perform the migration of the data; initiating, by the migration runner, the migration of the data, wherein the migration comprises a plurality of stages; storing, as the migration progresses through the plurality of stages, and at (Continued)

a migration data store of the framework, a current stage of the migration; and during the migration, using the migration proxy to read data from and write data to the data store.

16 Claims, 7 Drawing Sheets

Related U.S. Application Data

(60) Provisional application No. 63/260,119, filed on Aug. 10, 2021.

(58) Field of Classification Search
CPC .. G06F 2201/80; G06F 3/0604; G06F 3/0671; G06F 11/1433; G06F 11/2094; G06F 3/0647
USPC ................ 707/610, 624, 626, 655, 661, 809
See application file for complete search history.

(56) References Cited

U.S. PATENT DOCUMENTS

| | | | |
|---|---|---|---|
| 9,805,071 | B1 | 10/2017 | Ellis et al. |
| 10,404,579 | B1* | 9/2019 | Biemueller ......... H04L 41/0803 |
| 10,558,454 | B2 | 2/2020 | Mair et al. |
| 10,924,587 | B1* | 2/2021 | Chaudhuri ............ G06F 16/214 |
| 12,050,567 | B2 | 7/2024 | Chang et al. |
| 2015/0019478 | A1* | 1/2015 | Buehne ................. G06F 16/119 707/609 |
| 2017/0371716 | A1* | 12/2017 | Gujar ................... G06F 9/45558 |
| 2022/0229574 | A1* | 7/2022 | Tanpairoj .............. G06F 3/0679 |
| 2023/0008421 | A1* | 1/2023 | Ranatunga ............... C12N 1/04 |
| 2023/0010963 | A1 | 1/2023 | Ranatunga et al. |
| 2023/0047056 | A1 | 2/2023 | Chang et al. |

OTHER PUBLICATIONS

"Architecting database migration and replication using Striim", last updated Jul. 27, 2021, retrieved from https://cloud.google.com/architecture/architecting-database-migration-replication-striim#use_cases_for_database_migration_and_replication on Aug. 3, 2021, 13 pages.

Christopher Bussler, "Online Database Migration by Dual-Write: This is not for Everyone", Jun. 23, 2020, retrieved from https://medium.com/google-cloud/online-database-migration-by-dual-write-this-is-not-for-everyone-cb4307118f4b on Aug. 3, 2021, 35 pages.

Jacqueline Xu, "Online migrations at scale", Feb. 2, 2017, retrieved from https://stripe.com/blog/online-migrations, Jul. 22, 2021, 12 pages.

Official Communication for European Patent Application No. 22189684.8 dated Jan. 4, 2023, 15 pages.

Official Communication for European Patent Application No. 22189684.8 dated Jan. 30, 2025, 56 pages.

* cited by examiner

FRAMEWORK FOR LIVE DATA MIGRATION

CROSS-REFERENCE TO RELATED APPLICATIONS

This application is a continuation of U.S. patent application Ser. No. 17/818,272, filed Aug. 8, 2022, and titled "FRAMEWORK FOR ONLINE DATA MIGRATION," which application claims benefit of U.S. Provisional Patent Application No. 63/260,119, filed Aug. 10, 2021, and titled "FRAMEWORK FOR ONLINE DATA MIGRATION." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to systems and techniques for data migration. More specifically, embodiments of the present disclosure relate to systems and techniques, including a software framework, for migrating online, or live, data.

BACKGROUND

A background is provided for introductory purposes and to aid the reader in understanding the detailed description. The background should not be taken as an admission of any prior art to the claims.

Software and/or hardware deployments or environments may be installed, upgraded, and/or otherwise changed. Managing multiple deployments/environments in the context of such installations, upgrades, and/or other changes can be a complex endeavor. For example, services running in one or more environments may have particular interdependencies that can be broken after a version upgrade to one service is implemented, but not another service. As another example, data migration (transferring data between storage types, formats, or computer systems) may be impacted by upgrades or changes within an environment. That is, data migration may include converting data from one schema to another schema, and the schema versions may impact dependencies with respect to down-stream requests. Moreover, certain data migrations may involve bringing a database system offline/taking it down for some period of time.

SUMMARY

The systems, methods, and devices described herein each have several aspects, no single one of which is solely responsible for its desirable attributes. Without limiting the scope of this disclosure, several non-limiting features will now be described briefly.

Software services (e.g., including various software services, functionality, and the like) can involve managing large amounts of data. As software developers add new features and make improvements, the data may need to be migrated, e.g., the structure of the data may need to be changed as the software code evolves. There are two common strategies for changing the structure of stored data: offline upgrades and online upgrades. Some strategies for changing the structure of stored data involve offline upgrades. Consumer devices are often upgraded offline. For example, when a new version of the device's software becomes available, the device asks the user to save their work and shut down to perform upgrades and data migrations. Once the upgrade is complete, the user can start the device back up again using the updated software. From a software development standpoint, offline upgrades can provide advantages such as being relatively simple to implement and easy to understand. For this reason, offline upgrades are often the preferred strategy if the use case supports down time.

However, many software applications cannot tolerate down time. Such software applications/services/systems may need to support 24/7 mission-critical work around the world, often in life- and death situations. These systems must be available at all times, and thus upgrades and data migrations must be performed while the service is online. Online upgrades and data migrations can be much more technically challenging than offline ones. If software or a service needs to upgrade live, the new version must be up and available before the old version is taken down. This can lead to complexity because old code may use data in an old format, while new code may use data in a new format. For a less technical example, consider trying to raise the height of a table. An offline migration would be reasonably straightforward. Take the legs off, replace them with longer legs, and stand the table back up again. But if the table needs to be used while it is raised, it may be necessary to carefully replace the legs one at a time. But this presents a problem of determining how the new longer legs will be fit under the table while the shorter legs are still supporting it.

One strategy for online, large-scale data migrations can include the following: (1) Create the destination for the data to be migrated (e.g., a new column or table, other schema change, and/or the like, in a database, such as a relational database). (2) Migrate the data from the old format to the new format (e.g., including in the created destination). While the migration is in progress, code should read from the old format and write to both the old and new formats. (3) Once the migration is done, code can read and write the new format only, and the old format can be deleted (e.g., drop no-longer-used columns or tables).

This approach can appear straightforward at a high level. However, like the analogous solution in the table metaphor (e.g., building extendable table legs that are extended only after replacing each leg one by one), getting the details of such an online migration right poses a much more significant technical challenge than offline migrations. Engineers/developers can spend weeks or even months planning, developing, and carefully executing such a migration for their production environment. If there are just one, or a few, production environments where this migration needs to run, and the engineers have access to them, this can be a manageable project. However, in some environments the technical difficulty can increase exponentially for multiple reasons.

For example, the software applications/services/systems may be deployed in not just one or a few, but hundreds of production environments. Such environments may each involve special or custom features, functionality, constraints, and/or the like. Some environments/deployments may be in places where it is difficult to locate an engineer, such as on or under the water, in the air, or in remote outposts. In such situations, where hundreds of deployments each with various challenging constraints must be migrated/upgraded, unique technical solutions are necessary that can provide automation and which can scale. This is particularly important in environments in which software is being constantly improved, and where new capabilities are constantly being developed and added, necessitating frequent upgrades and data migrations. In some circumstances, such as in very fastest-moving projects, significant data migrations may be required almost monthly. Spending a month every month developing a data migration can be devastating to forward progress of the system and team.

An "online migration framework" (also referred to herein simply as "the framework"), according to various implementations and embodiments, is described herein which provides technical solutions to various technical challenges, including those described above and herein. Advantageously, the online migration framework can enable live data migration that can scale in at least three ways: data scale, deployment and execution scale, and development scale. Data scale: The framework can handle migrations involving large amounts of data in technically challenging distributed systems environments. Deployment and execution scale: The framework can enable migrations in many separate installations of software across many cloud environments and on-premises hardware, including on air-gapped networks. Development scale: The framework can be used by many teams building numerous features that require regular data migrations without impeding developers from progressing in their work. Thus, advantageously, the framework can deploy and automatically and safely run any number of migrations to any number of environments/deployments/customers.

The framework, according to various implementations, operates using a data store (but it is agnostic to the type of data store used) and a Migration Runner (also referred to herein as the "Runner", and described further below). The Migration Runner can provide and/or interact with a highly-available read-write lock service that provides coordination between the data access code within the service for the data to be migrated and the framework. In general, within the framework, each migration is given a unique, totally ordered numerical identifier, and migrations are run in that order in all deployments automatically by the Migration Runner. Migrations can be automatically rolled back in reverse order in the case that a deployment experiences an issue and needs to return the last known working state. Each migration can be in one of a number of ordered stages or states representing its progress (e.g., UNINITIALIZED, INITIALIZING, ROLLING_BACK, RUNNING, AWAITING_ADDITIONAL_ACTION, AWAITING_FINALIZATION, FINISHING, and FINISHED, as further described herein). A lock, provided via the lock service, protects the state of each migration, and a Migration Proxy (also referred to herein as the "Proxy", and described further herein) assists developers with writing code that is compatible with all states of the migration. These features are described in further detail herein. The data store stores metadata tracking progress of the various migrations, their associated stages, and other related information. Because the framework enforces in-order execution migration stages, and by using the data store with the associated metadata, the framework can advantageously enable tracking and insight into the migration status/states of all deployments and nodes, without the need to interrogate those deployments/nodes. The framework can advantageously scale across data, deployment and execution, and development.

Various embodiments of the present disclosure provide improvements to various technologies and technological fields. For example, as described above, existing data storage and migration technology is limited in various ways (e.g., is offline, is very time consuming, is not scalable, and/or the like), and various embodiments of the disclosure provide significant technical improvements over such technology. Additionally, various embodiments of the present disclosure are inextricably tied to computer technology. In particular, various embodiments rely on operation of technical computer systems and electronic data stores, automatic processing of electronic data, and the like. Such features and others (e.g., processing and analysis of large amounts of electronic data, management of data migrations, and/or the like) are intimately tied to, and enabled by, computer technology, and would not exist except for computer technology. For example, the interactions with, and management of, data described below in reference to various embodiments cannot reasonably be performed by humans alone, without the computer technology upon which they are implemented. Further, the implementation of the various embodiments of the present disclosure via computer technology enables many of the advantages described herein, including more efficient management of various types of electronic data.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer-readable storage medium having program instructions embodied therewith, and one or more processors configured to execute the program instructions to cause the systems and/or computer systems to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
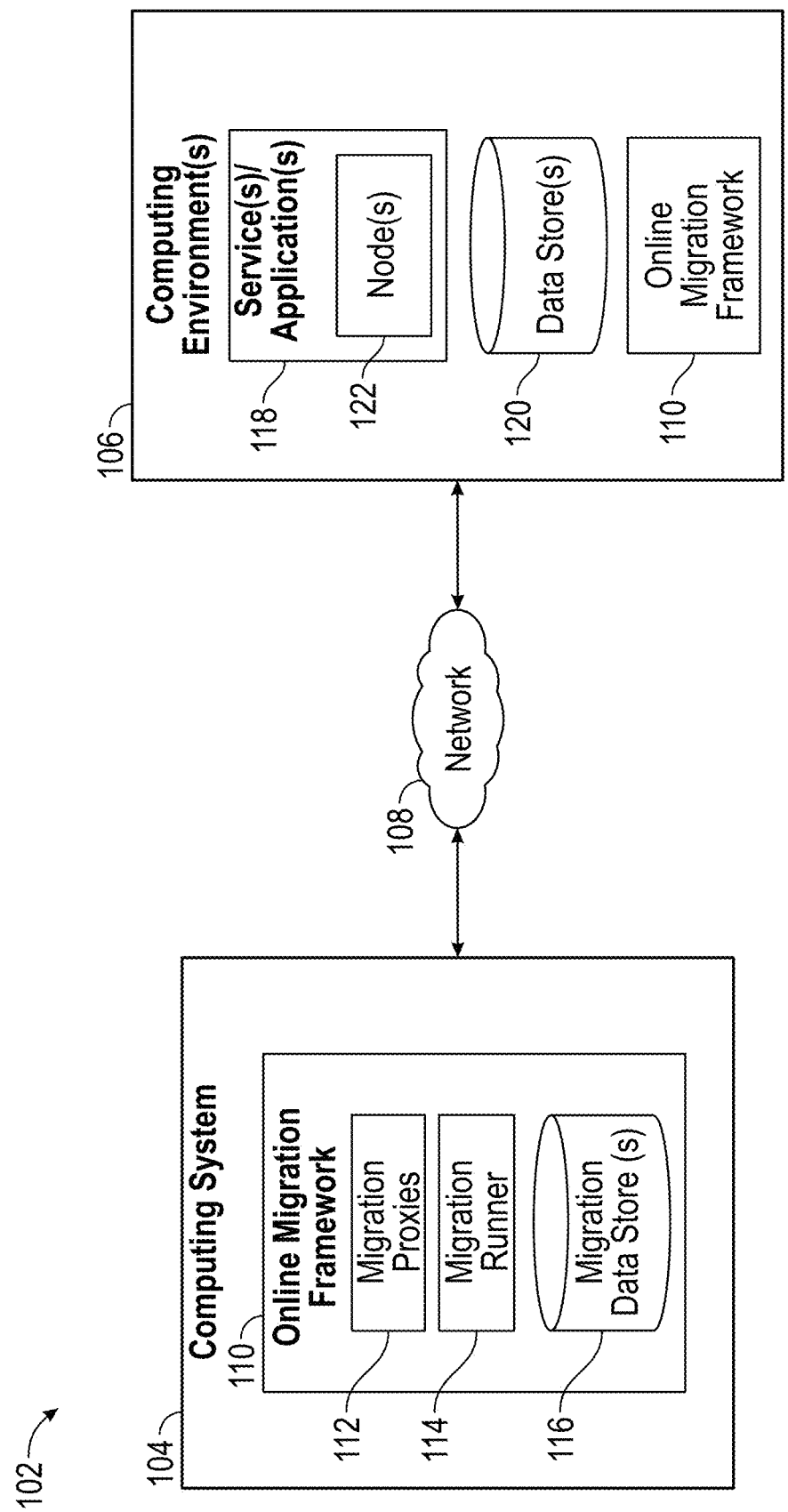
FIG. 1 is a block diagram of an example computing environment for implementing live data migrations using an online migration framework, according to various embodiments of the present disclosure.

Although certain preferred embodiments and examples are disclosed below, the inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As noted above, software services (e.g., including various software services, functionality, and the like) can involve managing large amounts of data. As software developers add new features and make improvements, the data may need to be migrated, e.g., the structure of the data may need to be changed as the software code evolves. There are two common strategies for changing the structure of stored data: offline upgrades and online upgrades. Some strategies for changing the structure of stored data involve offline upgrades. Consumer devices are often upgraded offline. For example, when a new version of the device's software becomes available, the device asks the user to save their work and shut down to perform upgrades and data migrations. Once the upgrade is complete, the user can start the device back up again using the updated software. From a software development standpoint, offline upgrades can provide advantages such as being relatively simple to implement and easy to understand. For this reason, offline upgrades are often the preferred strategy if the use case supports down time.

However, as also noted above, many software applications cannot tolerate down time. Such software applications/services/systems may need to support 24/7 mission-critical work around the world, often in life- and death situations. These systems must be available at all times, and thus upgrades and data migrations must be performed while the service is online. Various approaches and systems can safely and consistently deliver product and data updates live, causing zero disruption to users on needed services and systems. Examples of such approaches and systems are described in, for example, U.S. Pat. No. 9,805,071, issued Oct. 31, 2020, and titled "SYSTEM AND METHODS FOR LIVE DATA MIGRATION" ("the '071 patent"), which is hereby incorporated by reference herein; and U.S. Pat. No. 10,558,454, issued Feb. 11, 2020, titled "CONSTRAINT-BASED UPGRADE AND DEPLOYMENT" ("the '454 patent"), which is hereby incorporated by reference herein. For example, the '071 patent describes various example approaches to data/schema migration with no down time. The '454 patent describes various example approaches to online upgrading of services/deployments based on tasks and constraints.

Online upgrades and data migrations can be much more technically challenging than offline ones. If software or a service needs to upgrade live, the new version must be up and available before the old version is taken down. This can lead to complexity because old code may use data in an old format, while new code may use data in a new format. For a less technical example, consider trying to raise the height of a table. An offline migration would be reasonably straightforward. Take the legs off, replace them with longer legs, and stand the table back up again. But if the table needs to be used while it is raised, it may be necessary to carefully replace the legs one at a time. But this presents a problem of determining how the new longer legs will be fit under the table while the shorter legs are still supporting it.

One strategy for online, large-scale data migrations can include the following: (1) Create the destination for the data to be migrated (e.g., a new column or table, other schema change, and/or the like, in a database, such as a relational database). (2) Migrate the data from the old format to the new format (e.g., including in the created destination). While the migration is in progress, code should read from the old format and write to both the old and new formats. (3) Once the migration is done, code can read and write the new format only, and the old format can be deleted (e.g., drop no-longer-used columns or tables).

This approach can appear straightforward at a high level. However, like the analogous solution in the table metaphor (e.g., building extendable table legs that are extended only after replacing each leg one by one), getting the details of such an online migration right poses a much more significant technical challenge than offline migrations. Engineers/developers can spend weeks or even months planning, developing, and carefully executing such a migration for their production environment. If there are just one, or a few, production environments where this migration needs to run, and the engineers have access to them, this can be a manageable project. However, in some environments the technical difficulty can increase exponentially for multiple reasons.

For example, the software applications/services/systems may be deployed in not just one or a few, but hundreds of production environments. Such environments may each involve special or custom features, functionality, constraints, and/or the like. Some environments/deployments may be in places where it is difficult to locate an engineer, such as on or under the water, in the air, or in remote outposts. In such situations, where hundreds of deployments each with various challenging constraints must be migrated/upgraded, unique technical solutions are necessary that can provide automation and which can scale. This is particularly important in environments in which software is being constantly improved, and where new capabilities are constantly being developed and added, necessitating frequent upgrades and data migrations. In some circumstances, such as in very fastest-moving projects, significant data migrations may be required almost monthly. Spending a month every month developing a data migration can be devastating to forward progress of the system and team.

The present disclosure includes an "online migration framework" (also referred to herein simply as "the framework"), according to various implementations and embodiments, which provides technical solutions to various technical challenges, including those described above and herein. Advantageously, the online migration framework can enable live data migration that can scale in at least three ways: data scale, deployment and execution scale, and development scale. Data scale: The framework can handle migrations involving large amounts of data in technically challenging distributed systems environments. Deployment and execution scale: The framework can enable migrations in many separate installations of software across many cloud environments and on-premises hardware, including on air-gapped networks. Development scale: The framework can be used by many teams building numerous features that require regular data migrations without impeding developers from progressing in their work. Thus, advantageously, the framework can deploy and automatically and safely run any number of migrations to any number of environments/deployments/customers.

The framework, according to various implementations, operates using a data store (but it is agnostic to the type of data store used) and a Migration Runner (also referred to herein as the "Runner", and described further below). The Migration Runner can provide and/or interact with a highly-available read-write lock service that provides coordination between the data access code within the service for the data to be migrated and the framework. In general, within the framework, each migration is given a unique, totally ordered numerical identifier, and migrations are run in that order in all deployments automatically by the Migration Runner. Migrations can be automatically rolled back in reverse order in the case that a deployment experiences an issue and needs to return the last known working state. Each migration can be in one of a number of ordered stages or states representing its progress (e.g., UNINITIALIZED, INITIALIZING, ROLLING_BACK, RUNNING, AWAITING_ADDITIONAL_ACTION, AWAITING_FINALIZATION, FINISHING, and FINISHED, as further described below). A lock, provided via the lock service, protects the state of each migration, and a Migration Proxy (also referred to herein as the "Proxy", and described further below) assists developers with writing code that is compatible with all states of the migration. These features are described in further detail below. The data store stores metadata tracking progress of the various migrations, their associated stages, and other related information. Because the framework enforces in-order execution migration stages, and by using the data store with the associated metadata, the framework can advantageously enable tracking and insight into the migration status/states of all deployments and nodes, without the need to interrogate those deployments/nodes. The framework can advantageously scale across data, deployment and execution, and development.

II. Terms

To facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, MySQL databases, and the like), non-relational databases (e.g., NoSQL databases, and the like), in-memory databases, spreadsheets, comma separated values (CSV) files, extensible markup language (XML) files, TEXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) can be understood as being stored in one or more data stores. Additionally, although the present disclosure may show or describe data as being stored in combined or separate databases, in various embodiments such data may be combined and/or separated in any appropriate way into one or more databases, one or more tables of one or more databases, and/or the like.

III. Example Online Migration Framework and Related Computing Environment

FIG. 1 shows a block diagram of an example computing environment 102 for implementing live data migrations using an online migration framework, according to one or more embodiments. The example computing environment 102 includes a computing system 104 and one or more computing environments 106. While not shown in FIG. 1, the example computing environment 102 may additionally include, for example, one or more user computing devices which may execute various types of software applications by which users of the framework, and/or various services or applications, may interact the framework, services/applications, and/or the like. In various implementations, such user computing devices may include, for example, desktops, laptops, terminals, smartphones, smartTVs, and/or the like.

Figure 5:
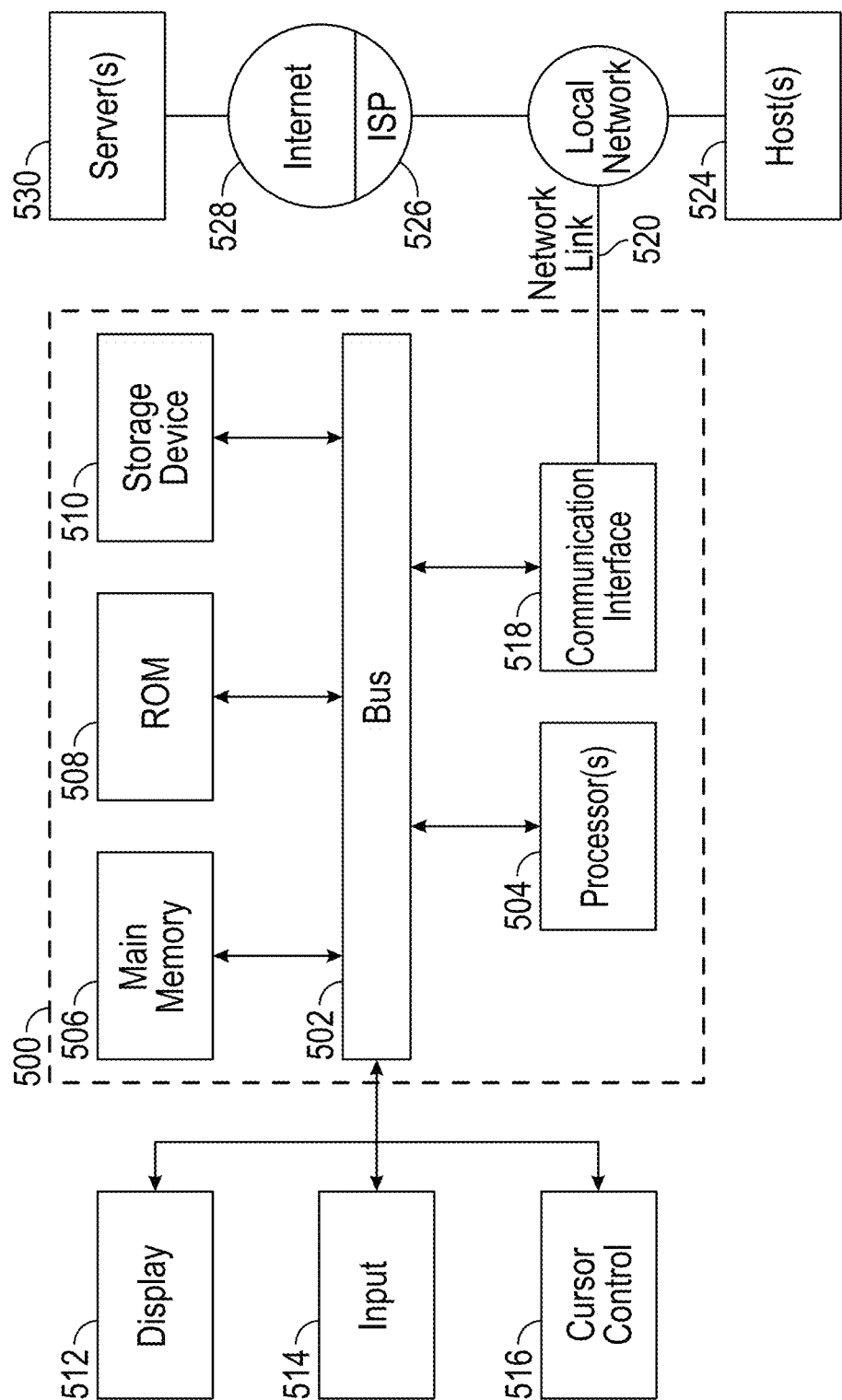
FIG. 5 is a block diagram illustrating a computer system upon which various embodiments may be implemented.

The various components of the example computing environment 102, including the computing system 104, the one or more computing environment(s) 106, and the user computing devices, can communicate with one another directly or indirectly via any appropriate communications links and/or networks, such as network 108 (e.g., one or more communications links, one or more computer networks, one or more wired or wireless connections, the Internet, any combination of the foregoing, and/or the like). Similarly, the various components (e.g., as described below) of the computing system 104 and the one computing environment(s) 106 may, in various implementations, communicate with one another directly or indirectly via any appropriate communications links (e.g., one or more communications links, one or more computer networks, one or more wired or wireless connections, the Internet, any combination of the foregoing, and/or the like). FIG. 5, described below, provides additional examples of aspects of implementations of such components of the example computing environment 102, the computing system 104, the one or more computing environments 106, and the like.

In various implementations, the computing system 104 may be part of, or comprise, various distributed, parallelized, containerized, and/or clustered computation resources and/or data storage resource. The computing system 104 may comprise a "back-end" or "cloud" server or other computing system. In some embodiments, data of the computing system 104 may be conceptually structured according to databases, tables, an object-centric data model represented by ontology, and/or the like. The computing system 104 may include various aspects, such as one or more processors, memory, data storage, computer-readable instructions, and/or the like, as described in reference to FIG. 5. Such aspects may be configured to provide the framework and other functionality described herein.

Similarly, in various implementations, the computing environment 106 may be part of, or comprise, various distributed, parallelized, containerized, and/or clustered computation resources and/or data storage resource. The computing environment 106 may comprise a "back-end" or "cloud" server or other computing system. In some embodiments, data of the computing environment 106 may be conceptually structured according to databases, tables, an object-centric data model represented by ontology, and/or the like. The computing environment 106 may include various aspects, such as one or more processors, memory, data storage, computer-readable instructions, and/or the like, as described in reference to FIG. 5. Such aspects may be configured to provide the framework and other functionality described herein.

As described below, in various implementations, the functionality of the framework described herein may be provided by the computing system 104, the computing environment 106, and/or any combination of the two and/or other aspects of the example computing environment 102 or other computing devices.

In various embodiments, the various components and aspects of the computing system 104 and/or the computing environment 106 may be implemented in various ways. For example, the computing system 104 and/or the computing environment 106 may be implemented as a single computing system, and/or various functions or services of the computing system 104 and/or the computing environment 106 may be split up and/or arranged differently from that shown in the example computing environment 102 of FIG. 1. Thus, for example, while in FIG. 1 various data stores are shown as being implemented as separate components, in other implementations the various data stores may be combined, separated into additional data stores/datasets/databases, and/or the like. As another example, the framework and/or various services/applications of the example computing environment 102 may be combined and/or separated in additional components and/or services, and/or may be implemented in different ones of the various aspects of the present disclosure. For example, various of the framework, services, and/or the like, may be implemented as separate computing systems or devices. However, for the purpose of providing a concise description in the present disclosure, the various functionalities are described in reference to the example implementation shown in the computing environment 102 of FIG. 1.

The computing system 104 can include an online migration framework 110. The framework 110 can comprise one or more software modules, software services, software engines, software applications, data stores, databases, and/or the like, for implementing the functionality described herein. Such may include, for example, software code and/or other types of computer-readable program instructions that may be executed by one or more processors to cause, e.g., the computing system 104, to provide the functionality described herein. As illustrated, in some embodiments the framework 110, and/or one or more aspects of the framework 110, may be implemented by the one or more computing environments 106. Further, the example computing environment 102 may include multiple implementations of the framework 110, e.g., at both the computing system 104 and the computing environment(s) 106, and/or in multiple computing environment(s) 106. Thus, the framework 110 may support any number of migrations, either via a single implementation of the framework, or through multiple implementations of the framework.

As used herein, the term "system" generally refers to the computing system 104 implementing the framework 110. However, "system" may also include various other aspects and/or other computer systems of the present disclosure because, in various implementations, and as described herein, the framework 110 and its associated functionality may be implemented by various other aspects and/or other computer systems.

The framework 110 may comprise one or more migration proxies 112, a migration runner 114, and one or more migration data stores 116. The migration proxies 112 and migration runner 114 can comprise modules, services, and/or the like of the framework 110 as mentioned above. The functionality of these various components of the framework 110 are described below, but in short, the framework 110 can enable rapid implementation of live data migrations in any number and type of computing environments. The migration data store(s) 116 can, for example, store information and metadata associated with implemented data migrations. The migration runner 114 can manage execution of data migrations. And the one or more migration proxies 112 can enable reading and writing of data during data migrations and depending on stages of the data migrations.

The one or more computing environments 106 comprise software and/or hardware deployments or environments by which various software services and/or applications 118 may be provided. The service(s) 118 can comprise one or more software modules, software services, software engines, software applications, and/or the like, for implementing various types of useful functionality to users and/or other computing systems/environments. Those services 118 may read data from and write data to one or more data stores 120. The services 118 may be distributed, e.g., across multiple computing resources or nodes 122. Similarly, the data store(s) 120 and/or associated databases may also be distributed, e.g., across multiple devices, locations, and/or the like.

As described herein, the service(s) 118 may be upgraded, which may include upgrading each of the associated node(s) 122. Similarly, the data store(s) 120, and/or data stored in the data store(s) 120, may be migrated. Such migration may include, for example, changing a format of the data, changing a schema of the data, changing a structure of the data, changing the data, adding to or removing from the data, changing a location of the data (whether physical or virtual), and/or the like. As described herein, it may be necessary or advantageous to perform a data migration while the data store is online or live, e.g., while the service(s) 118 that is in communication with the data store is in operation and may be writing data to, or reading data from, the data store(s) 120. As mentioned, the framework 110 provides an efficient way, and useful functionality, for implementing such online or live data migrations. In various embodiments, schemas and/or formats may include information such as whether data is structured as a table, the names of the columns of the table, the data types of the columns, user descriptions of the columns, and/or the like.

Figure 2:
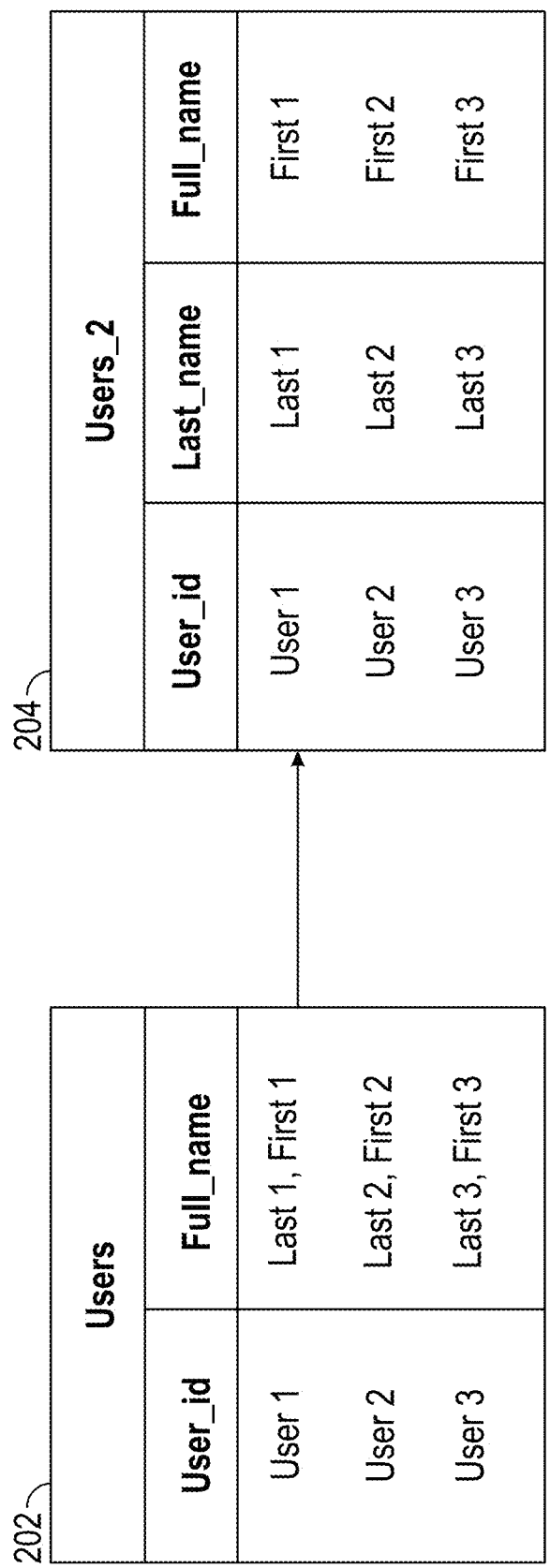
FIG. 2 is a block diagram illustrating an example data migration, according to various embodiments.

FIG. 2 is a block diagram illustrating a simplified example of a data migration. In the example of FIG. 2, the storage of a name is changed from a single last, first column, as shown in table 202, to two separate last_name and first_name columns, as shown in table 204. This simplified example of a data migration is used for illustration purposes as the features and functionality of the system and framework of the present disclosure are described below. For example, below are provided example pseudo-code to illustrate what the development of this simplified example migration might look like using the framework.

IV. Example Functionality of the Framework for Data Migration Specification

Advantageously, the framework (e.g., framework 110) can provide a way (e.g., one or more user interfaces and/or data stores) for developers (e.g., users of the framework) to write or define specifications for migrations. Writing a migration specification using the framework can be broken into three parts:

1. Pre-migration schema additions: Developers create tables, columns, and any other schema elements necessary to support a new format of the data (e.g., the format of the data to which the data is to be migrated). The following is example pseudo-code that may be written by a developer, in the framework, for this part:

```
CREATE TABLE Users_2 (
    user_id VARCHAR2 (128),
    last_nameVARCHAR2 (128),
    first_name VARCHAR2 (128),
    CONSTRAINT pk_users_2 PRIMARY KEY (user_id)
);
```

2. Migration batches: Developers write code to migrate data from the old format to the new format in batches. The framework also provides a migration data store (e.g., migration data store(s) 116) for migrations to store their progress during this phase, since it is possible at any point for the process running the migration to fail. This can avoid the need to start a long migration from scratch. The following is example pseudo-code that may be written by a developer, in the framework, for this part:

```
...
List<Users2Record> userBatch = sql.select(Users.USER_ID,
Users.FULL_NAME)
    .from (Users)
    .where (Users.USER_ID.greaterThan(getLastProcessedId( ) ) )
    .orderBy(Users.USER_ID.asc( ) )
    .limit (batchSize)
    .fetch (row                                          ->
```

```
    createUsers2Record (row.get (Users.USER_ID),
    row.get (Users.FULL_NAME) ) ) ;
if (userBatch.size ( ) > 0) {
    List<Query> inserts = userBatch.stream ( )
        .map (record                                     ->
        sql.insertInto (Users_2) .set (record)
        .onDuplicateKeyIgnore ( ) )
        .collect (Collections.toList ( ) ;
    slq.batch (inserts) .execute ( ) ;
    updateLastProcessedId (userBatch.get (userBatch.size
        ( ) - 1).getUserId ( ) )                         ;
} else {
    markMigrationCompleted ( ) ;
}
...
```

3. Post-migration schema drops: Developers drop any no-longer-needed schema elements and the data they contain. The following is example pseudo-code that may be written by a developer, in the framework, for this part:

```
DROP TABLE Users;
```

Because, as mentioned, the process of running these migrations could fail at any time, each of these parts under the framework can be idempotent, meaning that running them multiple times is safe and has the same effect as running them once (for the Data Definition Language ("DDL") statements, it suffices to catch any exception returned by the data store and check if it is the expected type; e.g., the table already exists).

V. Example Functionality of the Framework Related to Rollbacks

The framework can support rollback of migrations. The fastest way to mitigate an issue affecting a deployment is to return to the last known working state. This often means downgrading the software of the service/application (e.g., service/application 118) to an earlier version. However, if a migration (e.g., on related data store(s) 120) was in progress, the old version of the code of the service/application may not know how to handle this state, so it may be necessary to roll the data migration back (e.g., return to the pre-migration data format). Because the only reason to roll back a migration is to mitigate an issue, the framework enables rollbacks to be fast. This is accomplished by implementing rollback functionality in part one above, indicating that rollback code should be as fast as dropping the new columns or tables that have been created as part of the migration (e.g., to a new format).

VI. Example Functionality of the Migration Proxy

Developers may also need to update the code (e.g., of the service(s) 118) that accesses the associated data (e.g., of the related data store(s) 120) for the code to work correctly before, during, and after the migration. To support this, the framework also advantageously includes one or more "Migration Proxies" (e.g., migration proxies 112). Each Migration Proxy provides a wrapper or data access interface for developers to provide code for reading and writing data that is compatible with all states of the migration. The code and be provided, for example, via one or more user interfaces of the framework. The Migration Proxy can enable developers to provide a sequence of data access implementations as well as the identifiers of migrations occurring between each implementation. Developers can annotate methods on the data access interface identifying which are Read and which are Write methods. The Migration Proxy can provide a single implementation of the data access interface for developers to use. The Migration Proxy can also manage lock acquisition and determine which underlying implementations should execute code based on the status of each migration and the annotations on the method.

With the Migration Proxy, developers can put their data access code behind an interface and annotate the interface's methods with @Read or @Write. They can then implement this interface once for the new state of the data (e.g., the data pre-migration) and once for the old state (e.g., the data post-migration). Developers can also specify, along with the Write annotation, what the behavior should be while the migration is in progress, e.g.:

- Writing to both implementations (default).
- Writing to only the new implementation. For example, when adding a column to a table, where the new write is a superset of the old write.
- Writing only to the old implementation. For example, when the migration just drops a column, where the old write is a superset of the new write.
- Uncommonly, writing to a "middle" implementation that provides custom handling while the migration is still in progress. For example, when a migration both drops a column and adds a column to an existing table.

In the example of FIG. 2 above, the developer may implement, for example:

```
public interface UserStore {
  @Read
  User loadUser (String userId) ;
  @Write
  void storeUser (User) ;
}
```

Advantageously, the framework includes a process to make using the framework easier and more consistent for developers. The process enables developers to keep a primary implementation up to date with the latest data format, and subclass this implementation, overriding only the methods that need to be overridden, for each migration going backward. As this suggests, this process can be repeated for multiple migrations affecting the same data, and the Migration Proxy will accept a list of implementations and the migrations that go between. From the list, it chooses the correct implementation(s) to use based on the state of each migration. In the example of FIG. 2, a Migration Proxy for the UserStore could be created like so:

```
UserStore proxiedUserStore =
SimpleMigrationAwareProxy.wrap (
  UserStore.class,
  new LegacyUserStoreImpl (dbSession) ,
  new UserStoreImpl (dbSession) ,
  USER_STORE_MIGRATION_TASK_ID,
  dbSession) ;
```

Accordingly, the Proxy can include code that includes at least: a first read method compatible with a first (e.g., old) data format, a second read method compatible with a second (e.g., new) data format, a first write method compatible with the first data format, and a second write method compatible with the second data format.

In various implementations, a single Migration Proxy 112 may provide functionality for one or more migrations, and/or multiple Migration Proxies 112 may provide functionality for one or more migrations.

VII. Example Functionality of the Migration Runner

The Migration Runner 114 may provide various coordination and management functionality for migrations using the framework. Each of the migrations, at commit time, can be assigned a monotonically increasing identifier (e.g., USER_STORE_MIGRATION_TASK_ID). The Migration Runner can then run the migrations in the assigned order. By having migrations run in the same order in every applicable environment (or every applicable service/application/data store), the framework can advantageously maintain the number of possible stages/states of a data store to a manageable level and also look at the migration stages of any service and immediately know what the stages of the data store is even without inspecting it. As it runs migrations, the Runner coordinates with associated Migration Proxies by grabbing a write lock on a migration's stage/status whenever it changes it. Meanwhile, the Proxy grabs a read lock on the stage/status for the duration of the operation (e.g., a read or write) it is performing. Advantageously, this allows large-scale migrations to run safely with minimal impact on the rest of the code because multiple threads can hold the read lock while doing data access operations. The Runner only needs to hold the write lock for the brief moments where it is changing the migration stage/status in the data store, not during any actual migration execution.

A highly-available, 24/7 service (e.g., service 118) generally includes multiple nodes (e.g., node(s) 122). These multiple nodes may access a same data store, or multiple data stores, (e.g., data store(s) 120) to provide the service. Typically, not all the nodes can upgrade at the same time. Thus, at least one node typically remains live on an old binary/software version until at least one node becomes live on a new/upgraded binary version. Old binaries may not understand a new data format (e.g., of a post-migration data store) while new binaries would like to use the new format. Thus, the framework, via the Migration Proxy, can advantageously enable upgrading binaries (e.g., of services/applications) first before upgrading a data format/schema (e.g., running migrations). This is because the new binaries are enabled to understand and work with both old and new data formats, and also the binaries can continue working with data when migrations are in-progress.

When the Runner starts up, it can execute a consensus protocol with the other nodes of the application/service to determine what migrations are known by all nodes, but does not necessarily immediately start running them. This can be particularly advantageous in ever shorter development cycles, where a service may have multiple nodes with heterogeneous versions of software deployed. The Runner can thus determine what migrations are supported by all nodes so it can continue to make progress through the series of migrations even when a service is receiving frequent rolling upgrades. For example, the framework (e.g., the Runner) can write to the migration data store what migrations the various nodes support. Live nodes can hold a lock to signal liveness, dead nodes can lose the lease on their lock and have their entries deleted. Migrations up through the maximum migration version across live nodes can thus be determined and run. This process is also described below in reference to FIG. 4B.

VIII. Example Functionality of the Framework Related to Soak Time and Migration Stages To expedite rollbacks, the framework can employ a configurable "soak time" (e.g., default of four days, but configurable to other lengths of time) after a migration becomes available before the framework starts to run it. The Migration Runner can track each individual migration when it first becomes available. After soaking, the Runner begins its work. Running a migration proceeds in several stages, which can be more numerous than the three parts mentioned above, to handle the Runner failing at any point in execution. In various implementations, examples of these stages are illustrated in FIG. 3B, and can include:

1. Uninitialized (block 322): The migration has not yet begun, and all Proxies read and write the old data format (e.g., pre-migration format).
2. Rolling Back (block 336): The migration is in the process of rolling back to the Uninitialized state but may have yet to finish this.
3. Initializing (block 324): The Runner is executing pre-migration schema/format additions but may not have completed them. Rollback will need to run if a downgrade is required. Proxies still read and write the old format.
4. Running (block 326): Pre-migration schema additions are complete, and the migration has possibly started running its batches. Proxies read the old format and write both old and new (e.g., post-migration) formats (or just old or new based on developer-specified behavior).
5. Awaiting Additional Action (optional) (block 328): The migration has completed, but there is action outside of the framework's control that needs to be taken. For example, new data may need to be indexed into Elasticsearch or some other secondary index before the migration can be considered fully complete. As another example, all nodes of a service may need to come to consensus on some new state. External systems can programmatically mark their actions as complete and report back to the Runner, for example. Proxies now begin reading the new format but still write to both to support rollback.
6. Awaiting Finalization (block 332): The migration is complete. Proxies read the new format but still write to both to support rollback.
7. Finishing (block 338): The Runner is executing post-migration schema drops but may not have finished. The migration can no longer be rolled back. Proxies read and write only the new format.
8. Finished (block 340): The migration is complete and all old schemas (e.g., pre-migration data/formats) and data have been dropped.

Because the framework can enforce developers writing idempotent migration behavior, if the Runner fails at any point, that stage can be restarted and kept moving along without issue. The framework also employs an additional soak time (configurable for various lengths of time) between "Awaiting Finalization" and "Finishing". This can allow for identification of issues that may only become apparent once the new data format is available and addressing of those issues before it is no longer possible to roll back.

The stages described above and illustrated in FIG. 3B can comprise a set of ordered states. The stages can also comprise a state machine, where the migration generally proceeds through each of the stages as numbered above and as illustrated in FIG. 3B. However, in various implementations the "Awaiting Additional Action" stage is optional. In implementations using "Awaiting Additional Action", as noted above when in this state the framework may pause the migration (as indicated by arrow 330 of FIG. 3B) until a signal or indication is received that the outside action is complete. Then, the process may proceed to "Awaiting Finalization". Additionally, in various implementations, the "Rolling Back" stage can be moved to from any stage in which the migration is still in progress (e.g., as indicated by arrows 334 of FIG. 3B), which then leads back to the "Uninitialized" stage.

The Runner stores the current stage of each migration in the migration data store(s) 116. Advantageously, by implementing the set of stages described above as a set of ordered states and/or a state machine, and keeping track of the stages using the Runner and the migration data store(s) 116, a status of any given migration can be known without accessing or detailed review of the data. For example, the Runner, simply by determining the current stage of a migration (e.g., from the migration data store 116), can determine what stages of the migration have been completed, and which have not. Such can quickly and efficiently be performed for any number of migrations within the framework.

Figure 3A:
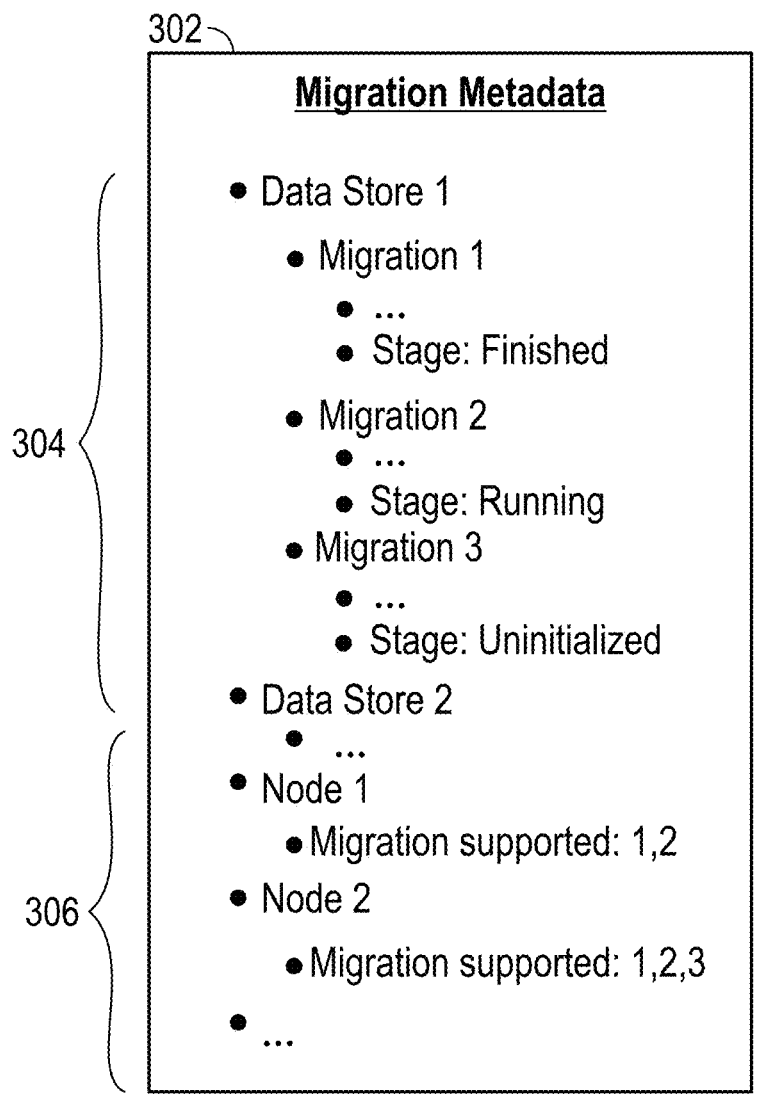
FIG. 3A is a diagram illustrating example migration metadata, according to various embodiments.
Figure 3B:
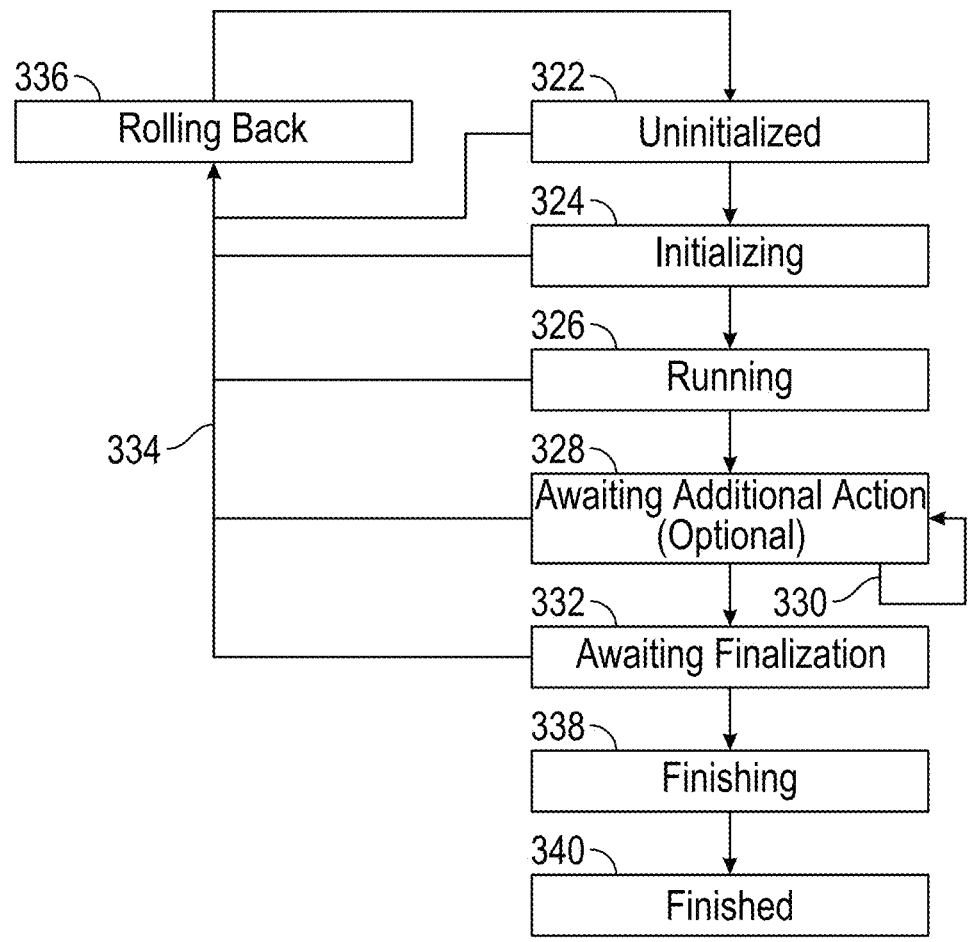
FIG. 3B is a diagram illustrating example migration stages, according to various embodiments.

FIG. 3A is a diagram illustrating example migration metadata 302 that may be stored in the migration data store(s) 116, according to various embodiments. The metadata may include, as noted above, information 304 related the status of various migrations. Such information may include, for example, various data stores and/or services, related applicable migrations within the framework (e.g., migrations 1, 2, and 3 for data store 1), the statuses of each of the migrations, and/or the like. As illustrated in the example of FIG. 3A, migration 2 is currently running on data store 1, and the current stage is "Running". Migration 1 is already complete on data store 1, as indicate by the stage "Finished". Migration 3's stage is "Uninitialized". As described above, each of the migrations applicable to data store 1 is assigned a monotonically increasing identifier (e.g., 1, 2, 3, but other types of identifiers are possible).

The metadata may also include, as noted above, information 306 regarding the migrations supported by various nodes (and/or services/applications and their associated versions). For example, node 1 supports migrations 1 and 2, while node 2 supported migrations 1, 2, and 3. Such may be the case if node 2 has been upgraded to a more recent service version than node 1. As described herein, the minimum and/or maximum supported migrations of various nodes associated with a service and using a given one or more data stores may be used by the framework in determining an appropriate migration of those data store(s) (including, e.g., whether to migrate or rollback those data stores, limitations of migrations or rollbacks, and/or the like).

After a migration has been completed, it is generally desirable to remove the migration code. However, any given migration may need to run on potentially hundreds of separate computing environments. Some migrations may take less than a second, while others can take weeks. Some environments may take upgrades nearly continuously, staying on the bleeding edge of product offerings. Others may upgrade less frequently.

To have a clear point at which migration code can be removed, the framework can advantageously enable designation of specific releases as "checkpoints." For upgrades beyond a checkpoint, a service must complete all the migrations up to that checkpoint. Each release of software reports (e.g., to an upgrade server or central upgrade services component as described in the '454 patent) (1) which schema versions each release supports, and (2) the current schema version of the live service based on what migrations have run. For the release beyond a checkpoint, the minimum schema version is changed to the version of the last migration in the checkpoint so that the framework can enforce this requirement. The framework can also require that migrations be rolled back before downgrades since the old binary will report a maximum schema version that is only as high as the migrations it knows about.

This post-checkpoint cleanup is often relatively trivial because of the above-mentioned multiple implementations supporting both old and new data formats. Because the service already has the complete implementation of the data access code for all completed migrations, the developer can simply delete the old subclasses that supported old versions and in-line the latest implementation rather than having it wrapped in a Proxy. This once again can advantageously allow scaling of development efforts while keeping a codebase efficient. For example, developers may only need spend time on the order of minutes to clean up after a checkpoint.

IX. Further Features and Functionality of the Framework

The framework can also advantageously include a comprehensive testing framework for these online migrations. Migration developers can leverage a simple Junit test extension that provides a custom Migration Runner for the migration they are testing and allows easy roll-forward and roll-back testing. This same extension framework can enable more comprehensive testing across the entire product. When a new migration is committed, the build system of the framework can generate tests for every combination of data store that is supported. It can also generate tests for the various migration stages (e.g., Uninitialized, Running, Awaiting Finalization, and Finished) and can run tests across all those combinations to ensure the products work throughout all phases of the migration.

Further, the framework can advantageously be service- and datastore-agnostic and has been tested/implemented across a number of services and several different data stores. To facilitate this, a suite of abstract test classes that can be implemented with a service's implementation of the framework have been provided to quickly test that the implementation is working properly. This can allow rapid scaling of the framework's ability to migrate data safely and sustainably across various products in an ecosystem.

As a result of the various features and functionality, the framework can advantageously provide a greatly improved ability to continually deliver improvements and new features to customers. In one case, a developer wrote, tested, and shipped a migration using the framework in only about two hours. Without the framework, it likely would have taken days and required much more careful thought and planning, and possibly caused bugs in the field, as even a fairly simple data migration is still a complex problem to solve without the framework.

The framework can be extended to uses beyond data migration and has had several common migration types built into it so developers may only need to write about ten lines of code to complete a migration, allowing them to focus on delivering the best technology for customers. In an example, the framework can be used to develop "mini-frameworks" for certain types of migrations, such as application configuration, adding new core ontology types, specific code for performantly adding indexes to tables, and more. These mini-frameworks use the mechanisms of the framework such as the fact that upon finalization, no binary can roll back to any version that does not contain the migration, which provides an effective consensus protocol on whether a feature can be used without rolling back to before it was available.

In various implementations, the framework may comprise one or more application programming interfaces ("APIs"), e.g., for configuring migrations and/or Proxies, for communicating with the framework (e.g., the Runner), for providing communication from the framework (e.g., the Runner and/or the Proxies) to services and/or data stores being migrated, and/or the like.

X. Example Operations of the System and Framework

Figure 4A:
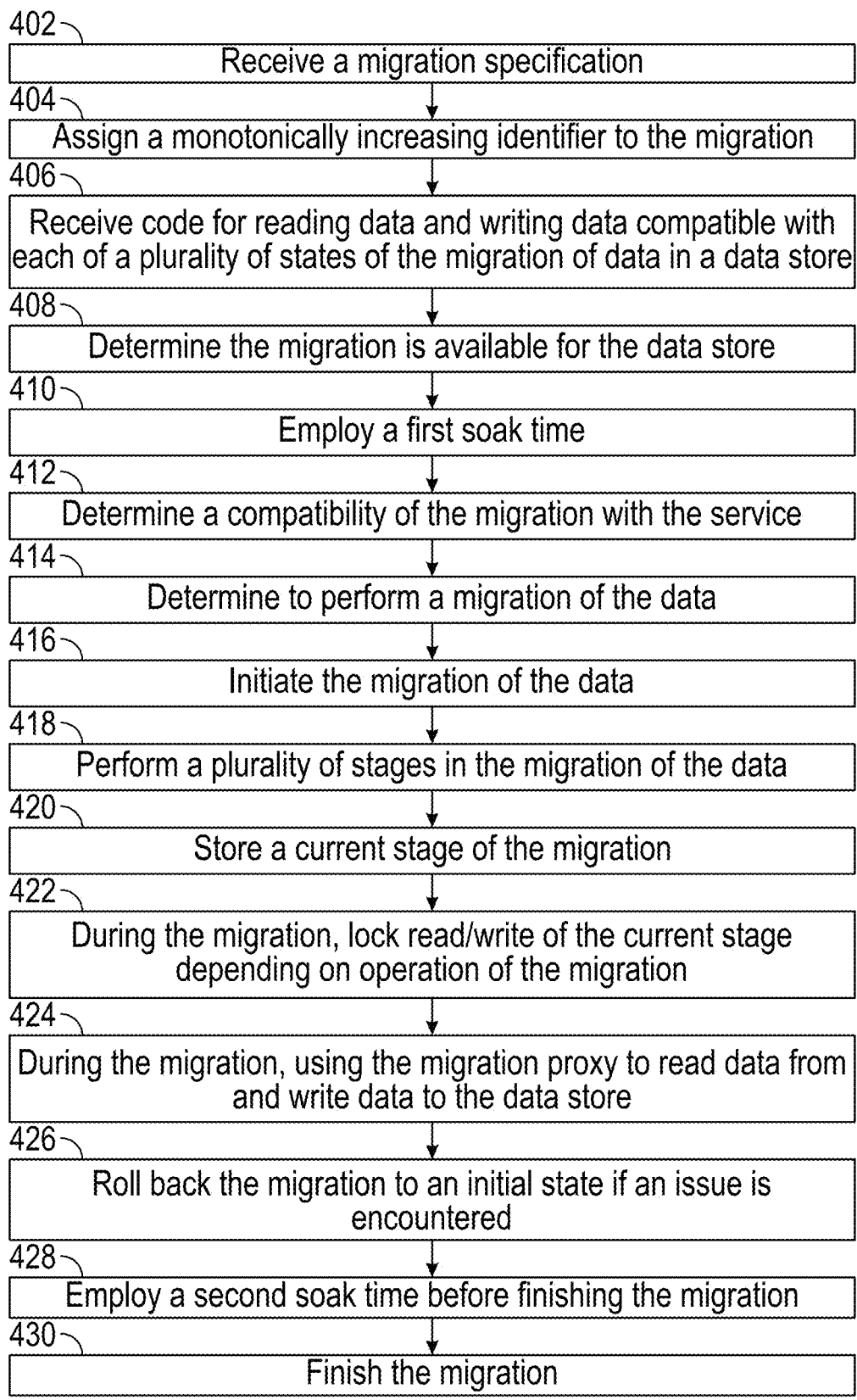
FIGS. 4A-4B show flowcharts illustrating example operations of the online migration framework, according to various embodiments.
Figure 4B:
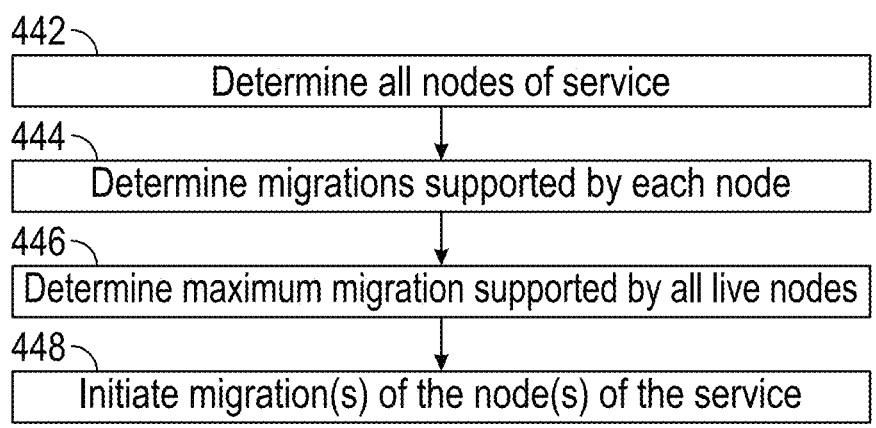

FIGS. 4A-4B show flowcharts illustrating example operations of the system and online migration framework 110, according to various embodiments. The blocks of the flowcharts illustrate example implementations, and in various other implementations various blocks may be rearranged, optional, and/or omitted, and/or additional block may be added. In various embodiments, the example operations of the system illustrated in FIGS. 4A-4B may be implemented, for example, by the one or more aspects of the framework 110, computing system 104, computing environment(s) 106, other aspects of the computing environment 102, and/or the like.

Referring to FIG. 4A, at block 402, the framework receives a migration specification. As described above, the migration specification can be provided by a developer via, e.g., one or more user interfaces of the framework. The migration specification can include code defining, e.g., schema/format additions, migration batches, and post-migration schema/format drops. The migration specification can be specific to a particular data store, service, computing environment, and/or the like, and/or may be applicable to multiple data stores, services, computing environments, and/or the like. At block 404, the framework (e.g., via the Runner) assigns a monotonically increasing identifier to the received migration. The identifier may be monotonically increasing with respect to migrations associated with a particular data store (and/or the like), and/or multiple data stores (and/or the like). The migration specification and the migration proxy can be stored in the migration data store(s).

At block 406, the framework receives code for a Proxy, e.g., including code for reading data and writing data compatible with each of a plurality of states of a migration of data in the data store. At block 408, the framework (e.g., via the Runner) determines that the migration is available for the data store. At block 410, the framework (e.g., via the Runner) may employ a first soak time before proceeding with running the migration. At block 412, the framework (e.g., via the Runner) determines a compatibility of the migration with the service. At block 414, the framework (e.g., via the Runner) determines to perform the migration of the data (e.g., in the data store). Blocks 410, 412, and 414 may be, in various implementations, variously optional and/or may overlap in various ways. For example, the first soak time may be optional, and/or may be employed after determining compatibility and/or to perform the migration. Determining to perform and/or compatibility of the migration may be based on, for example, a consensus of nodes for the service, as described above and in reference to FIG. 4B below. Determining to perform the migration may be based on determining compatibility and/or satisfaction of the first soak time. Various other combinations are possible, and may be described above.

At block 416, the framework (e.g., via the Runner) initiates migration of the data in the data store. The stage of the migration is updated and stored in the migration data store(s). At block 418, the framework (e.g., via the Runner) performs a plurality of stages of the migration as described above, e.g., in reference to FIG. 3B. These stages and the migration of the data may include, for example, actual migration of the data to a new format while the service is online or live. Execution of the migration may include various functionalities and processes and described herein, and in reference to further blocks of the flowchart of FIG. 4A (some of which may be performed repeatedly). For example, at block 420, the framework (e.g., via the Runner) stores and/or updates a current stage of the migration in the migration data store. The stored current stage of the migration is updated in the migration data store by the Runner each time the stage changes during the migration. At block 422, during the migration, the Runner grabs a write lock on the current stage of the migration during a change of the current stage of the migration, and the Proxy(ies) grabs a read lock on the current stage of the migration during read or write operations. At block 424, during the migration, the Proxy(ies) are used to read data from and write data to the data store, where different functions/implementations/code may be used depending on: (1) whether the old or new format is being written to/read from, and (2) the stage of the migration. At block 426, the framework (e.g., via the Runner) may rollback the migration to an initial state (e.g., return to an old data format and an "Uninitialized" stage) if an issue is encountered (e.g., some error, regression of a version/compatibility of the application/service, and/or the like). At block 428, the framework (e.g., via the Runner) may employ a second soak time before proceeding with finishing the migration. At block 430, the framework (e.g., via the Runner) may finish the migration.

Referring to FIG. 4B, at block 442, the framework (e.g., via the Runner) determines all nodes of the service/application. At block 444, the framework (e.g., via the Runner) determines what applicable migrations are supported by each node. There may be variance in the migrations supported because the various nodes may be on different version of the service. As noted above, the framework (e.g., the Runner) can write to the migration data store what migrations the various nodes support. At block 446, the framework (e.g., via the Runner) determines a maximum migration (e.g., a highest of the monotonically increasing identifiers) supported by all nodes. In some implementations, the maximum migrations may be determined based on all live nodes (e.g., as some nodes may not be functional for various reasons). At block 448, the framework (e.g., via the Runner) initiates migrations based on the determined supported migration. In some cases, this may comprise a single migration for a single data store. However, in other cases this may include migration of multiple data stores that are used by various of the nodes of the service. Thus, advantageously, framework can thus determine what migrations are supported by all nodes so it can continue to make progress through the series of migrations even when a service is receiving frequent rolling upgrades.

Migrations up through the maximum migration version across live nodes can thus be determined and run.

XI. Additional Implementation Details and Embodiments

In an implementation the system (e.g., one or more aspects of the computing system 104, one or more aspects of the computer environment(s) 106, one or more aspects of the framework 110, other aspects of the computing environment 102, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 5) to implement one or more aspects of the modules and/or functionality described herein. Further, in this implementation, one or more services/modules/engines/and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various embodiments of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may then be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a service, module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 5 shows a block diagram that illustrates a computer system 500 upon which various implementations and/or aspects (e.g., one or more aspects of the computing system 104, one or more aspects of the computer environment(s) 106, one or more aspects of the framework 110, other aspects of the computing environment 102, and/or the like) may be implemented. Multiple such computer systems 500 may be used in various implementations of the present disclosure. Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random-access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The main memory 506 may, for example, include instructions to implement server instances, queuing modules, memory queues, storage queues, user interfaces, and/or other aspects of functionality of the present disclosure, according to various implementations.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), and/or the like, is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more computer-readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

Various forms of computer-readable storage media may be involved in carrying one or more sequences of one or more computer-readable program instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

XII. Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A computer-implemented method for implementing a framework for migration of live data, the computer-implemented method comprising, by one or more hardware processors executing program instructions: receiving, at a migration proxy of the framework, code for reading data and writing data compatible with each of a plurality of states of a migration of data in a data store, wherein a service in communication with the data store is in operation; determining, by a migration runner of the framework, to perform the migration of the data; initiating, by the migration runner, the migration of the data, wherein the migration comprises a plurality of stages; storing, as the migration progresses through the plurality of stages, and at a migration data store of the framework, a current stage of the migration; and during the migration, using the migration proxy to read data from and write data to the data store.

Clause 2: The computer-implemented method of Clause 1, wherein the plurality of states comprises at least a first data format and a second data format different from the first data format.

Clause 3: The computer-implemented method of Clause 2, wherein the code includes at least: a first read method compatible with the first data format, a second read method compatible with the second data format, a first write method compatible with the first data format, and a second write method compatible with the second data format.

Clause 4: The computer-implemented method of any of Clauses 1-3 further comprising, by the one or more hardware processors executing program instructions: determining, by the migration runner, a compatibility of the migration with the service.

Clause 5: The computer-implemented method of Clause 4, wherein determining the compatibility comprises: determining all nodes of the service; determining migrations supported by each of the determined nodes; and determining a maximum migration supported by all live nodes of the determined nodes.

Clause 6: The computer-implemented method of any of Clauses 1-5 further comprising, by the one or more hardware processors executing program instructions: assigning a monotonically increasing identifier to the migration.

Clause 7: The computer-implemented method of any of Clauses 1-6, wherein the migration is one of a plurality of migrations, and wherein each of the plurality of migrations is assigned a respective one of a plurality of monotonically increasing identifiers.

Clause 8: The computer-implemented method of any of Clauses 1-7 further comprising, by the one or more hardware processors executing program instructions: determining, by the migration runner, that the migration is available for the data store; and employing, by the migration runner, a first soak time before determining to perform the migration.

Clause 9: The computer-implemented method of any of Clauses 1-8 further comprising, by the one or more hardware processors executing program instructions: employing, by the migration runner, a second soak time before finishing the migration.

Clause 10: The computer-implemented method of any of Clauses 1-9, wherein the plurality of stages are ordered.

Clause 11: The computer-implemented method of any of Clauses 1-10, wherein the plurality of stages comprise at least: uninitialized, rolling back, initializing, running, awaiting additional action, awaiting finalization, finishing, and finished.

Clause 12: The computer-implemented method of Clause 11, wherein the awaiting additional action stage comprises a stage in which the framework is waiting for completion of an action outside of control of the framework.

Clause 13: The computer-implemented method of any of Clauses 1-12, wherein during the migration, the migration runner grabs a write lock on the current stage of the migration during a change of the current stage of the migration, and the migration proxy grabs a read lock on the current stage of the migration during read or write operations.

Clause 14: The computer-implemented method of any of Clauses 1-13 further comprising, by the one or more hardware processors executing program instructions: rolling back the migration of the data to an initial state.

Clause 15: The computer-implemented method of any of Clauses 1-14 further comprising, by the one or more hardware processors executing program instructions: providing, by the framework, a user interface configured to receive migration specifications including at least: migration schema or format changes, code to migrate data from an old schema or format to a new schema or format, and code to remove any schema or forma elements no longer needed after the migration.

Clause 16: The computer-implemented method of any of Clauses 1-15, wherein the framework includes at least one of: checkpoints or a testing framework.

Clause 17: A system comprising: a computer readable storage medium having program instructions embodied therewith; and one or more processors configured to execute the program instructions to cause the system to perform the computer-implemented method of any of Clauses 1-16.

Clause 18: A computer program product comprising a computer-readable storage medium having program instructions embodied therewith, the program instructions executable by one or more processors to cause the one or more processors to perform the computer implemented method of any of Clauses 1-16.

What is claimed is:

1. A computer-implemented method for migration of live data, the computer-implemented method comprising, by one or more hardware processors executing program instructions:
   receiving code for reading data and writing data compatible with at least a first data format and a second data format different from the first data format;
   initiating a migration of data from the first data format to the second data format, wherein the migration comprises a plurality of stages; and
   during the migration:
      reading data from either the first data format or the second data format;
      writing data to both the first and second data formats during stages of the migration in which rollback of the migration is supported; and
      writing data to the second data format and not writing data to the first data format during stages of the migration in which rollback of the migration is not supported.

2. The computer-implemented method of claim 1, wherein the code includes at least: a first read method compatible with the first data format, a second read method compatible with the second data format, a first write method compatible with the first data format, and a second write method compatible with the second data format.

3. The computer-implemented method of claim 1 further comprising, by the one or more hardware processors executing program instructions:
   determining a compatibility of the migration with a service in that accesses the data.

4. The computer-implemented method of claim 3, wherein determining the compatibility comprises:
   determining all nodes of the service;
   determining migrations supported by each of the determined nodes; and
   determining a maximum migration supported by all live nodes of the determined nodes.

5. The computer-implemented method of claim 1 further comprising, by the one or more hardware processors executing program instructions:
   assigning a monotonically increasing identifier to the migration.

6. The computer-implemented method of claim 1, wherein the migration is one of a plurality of migrations, and wherein each of the plurality of migrations is assigned a respective one of a plurality of monotonically increasing identifiers.

7. The computer-implemented method of claim 1 further comprising, by the one or more hardware processors executing program instructions:
   determining that the migration is available for the data; and
   employing, a first soak time before determining to perform the migration.

8. The computer-implemented method of claim 1 further comprising, by the one or more hardware processors executing program instructions:
   employing a second soak time before finishing the migration.

9. The computer-implemented method of claim 1, wherein the plurality of stages are ordered.

10. The computer-implemented method of claim 1, wherein the plurality of stages comprise at least: uninitialized, rolling back, initializing, running, awaiting additional action, awaiting finalization, finishing, and finished.

11. The computer-implemented method of claim 10, wherein the awaiting additional action stage comprises waiting for completion of an action outside of control of a framework managing the migration.

12. The computer-implemented method of claim 1, wherein during the migration, a write lock is in place during a change of a current stage of the migration, and a read lock is in place during the current stage of the migration during read or write operations.

13. The computer-implemented method of claim 1 further comprising, by the one or more hardware processors executing program instructions:
   rolling back the migration of the data to an initial state.

14. The computer-implemented method of claim 1 further comprising, by the one or more hardware processors executing program instructions:
   providing a user interface configured to receive migration specifications including at least:
      migration schema or format changes,
      code to migrate data from an old schema or format to a new schema or format, and
      code to remove any schema or forma elements no longer needed after the migration.

15. A system comprising:
   one or more non-transitory computer-readable storage medium having program instructions embodied therewith; and
   one or more processors configured to execute the program instructions to cause the system to:
      receive code for reading data and writing data compatible with at least a first data format and a second data format different from the first data format;
      initiate a migration of data from the first data format to the second data format, wherein the migration comprises a plurality of stages; and
      during the migration:
         read data from either the first data format or the second data format;
         write data to both the first and second data formats during stages of the migration in which rollback of the migration is supported; and write data to the second data format and not write data to the first data format during stages of the migration in which rollback of the migration is not supported.

16. A computer program product comprising one or more non-transitory computer-readable storage medium having program instructions embodied therewith, the program instructions executable by one or more processors to cause the one or more processors to:
- receive code for reading data and writing data compatible with at least a first data format and a second data format different from the first data format;
- initiate a migration of data from the first data format to the second data format, wherein the migration comprises a plurality of stages; and
- during the migration:
  - read data from either the first data format or the second data format;
  - write data to both the first and second data formats during stages of the migration in which rollback of the migration is supported; and
  - write data to the second data format and not write data to the first data format during stages of the migration in which rollback of the migration is not supported.

* * * * *